United States Patent [19]

Mitchell

[11] 4,152,589

[45] May 1, 1979

[54] OPTICAL ROTATIONAL ENCODER

[75] Inventor: Charles S. Mitchell, Palo Alto, Calif.

[73] Assignee: Silonics, Inc., Sunnyvale, Calif.

[21] Appl. No.: 837,554

[22] Filed: Sep. 28, 1977

[51] Int. Cl.$^2$ .............................................. G01D 5/34
[52] U.S. Cl. ......................... 250/231 SE; 250/237 G
[58] Field of Search ................... 250/231 SE, 237 G; 356/169; 324/175

[56] References Cited

U.S. PATENT DOCUMENTS 3,244,895  4/1966  Anderegg ..................... 250/231 SE Primary Examiner—James B. Mullins
Attorney, Agent, or Firm—Limbach, Limbach & Sutton

[57] ABSTRACT

An optical encoder of the type having a fixed and rotating disc adjacent each other with superimposed varying light transmission patterns, such as slits, wherein one or more light beams are passed therethrough and the light pattern detected is an indication of the relative rotation between the fixed and rotary disc. A special optical element is located on one side of the fixed and rotary discs while the light source, detectors and electronics are located on another side of said discs. The optical element is a single solid optically clear piece of material with certain outside surface areas selectively positioned with respect to the light beams at angles for either total reflection or total transmission in a manner to provide a desired optical path.

5 Claims, 9 Drawing Figures

OPTICAL ROTATIONAL ENCODER

BACKGROUND OF THE INVENTION

This invention relates generally to position encoders, and more particularly to optical type rotational encoders.

Rotational encoders are utilized extensively in electromechanical products. An electrical signal is generated by the encoder that is representative of the rotational speed, position, or some related characteristic of a rotating mechanical part being monitored. This signal is then generally used, in addition to monitoring the motion of the part to which the encoder is attached, for controlling motion of a related part or perhaps the motion of that very part itself.

A very popular form of rotation encoder is an optical one. Examples of prior optical rotational encoders are described in U.S. Pat. Nos. 3,096,444 — Seward (1963); 3,193,744 — Seward (1965); 3,187,187 — Wingate (1965); and 3,244,895 — Anderegg, Jr. (1966).

It is a principal object of the present invention to provide an optical encoder that is of a simpler and less expensive design, that is simple to align and that at the same time provides an accurate electrical signal representative of the mechanical rotation of the part to which the encoder is attached.

SUMMARY OF THE INVENTION

Briefly, this and other objects are accomplished by the present invention wherein a solid clear optical element is positioned on one side of stationary and rotary encoder discs for simply and inexpensively controlling travel of light therethrough. A light source and one or more light detectors as well as all electronic elements that are a part of the encoder are all provided on an opposite side of the discs. The solid optical piece, in a preferred form, receives light from the light source through its front surface with little reflection and, with a maximum amount of internal reflection directs light through the encoder disc onto a detector. The light leaves the optical piece toward the encoder with little reflection back into the piece. The optical path within the element is controlled by rear planar surfaces oriented with respect to the light beams to totally reflect them within the element. These rear surface interfaces between the solid material and surrounding air are oriented with the light in excess of the critical angle for the optical material being utilized. No reflective coatings are necessary. The element is preferably formed from plastic by molding and is thus a simple and inexpensive item comprising the entire optics between the light source and the detector of the encoder assembly. All of the electrical elements are contained on one side of the discs without the necessity for optical or electrical commutation. All of the optical elements including the light source in the detectors are held stationary.

Other objects, features and advantages of the various aspects of the present invention will become apparent from the following description of its preferred embodiment which should be taken in conjunction with the accompanying drawings.

DESCRIPTION OF A PREFERRED EMBODIMENT

Figure 1:
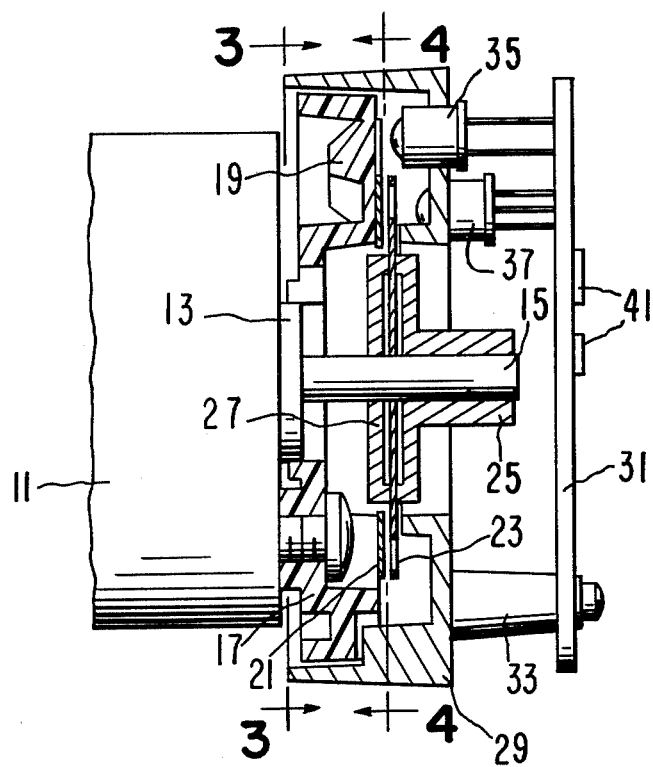
FIG. 1 is a sectional view of an encoder utilizing the various aspects of the present invention and represents the section 1—1 indicated on the view of FIG. 4.
Figure 2:
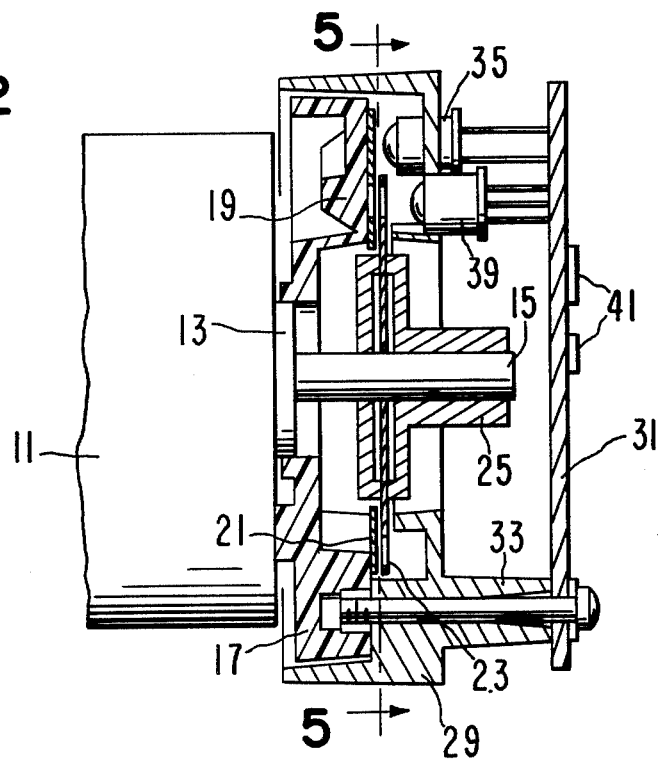
FIG. 2 is another section of the encoder of FIG. 1 taken across section 2—2 indicated in FIG. 4.

The encoder illustrates in the figures by way of a specific example is designed for mounting on the end of a small electric motor having a housing 11. As part of the base 11 is a stationary shoulder 13 through which extends a rotary shaft 15. The shaft 15 extends completely through the motor and it is on the other side (not shown) that the driven mechanism is connected thereto.

The encoder includes a base member 17 that is threadedly attached by a number of screws to the motor housing 11 and remains stationary with respect thereto. As part of the base is a solid optical element 19 which is described in detail hereinafter. The optical element 19 may be molded from a clear plastic material as a separate part or may be molded as a unitary part of the base 17. A preferred material for the optical element 19 is clear polycarbonate. A thin disc stator 21 is attached to the base element 17 by screws. It may be preferable in some cases to form the stator 21 and base 17 as a single unitary element.

Attached to the rotating shaft 15 is a thin disc armature 23. The armature disc 23 is held onto the shaft 15 by a hub 25 and a hub clamp 27. The entire mechanism is enclosed by an opaque cover 29 in order to keep out extraneous light.

A printed circuit board 31 is attached to the cover 29 by a post 33. The printed circuit board 31 carries a light emitting diode (LED) source 35 and two light detectors 37 and 39 through their respective stiff electrical leads. The printed circuit board 31 includes wiring printed thereon (not shown) and signal conditioning circuit elements 41. The elements 41 may pre-amplify the signal from the detector a sufficient amount so that background noise will not unduly interfere with it. The elements 41 may also balance the two signals from the two detectors.

Figure 3:
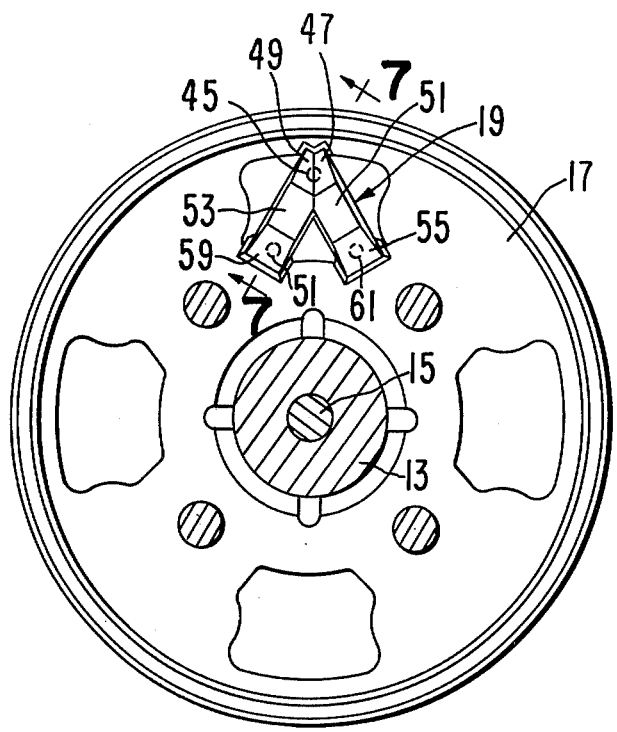
FIG. 3 is a view of the encoder of FIGS. 1 and 2 taken at section 3—3 of FIG. 1.
Figure 6:
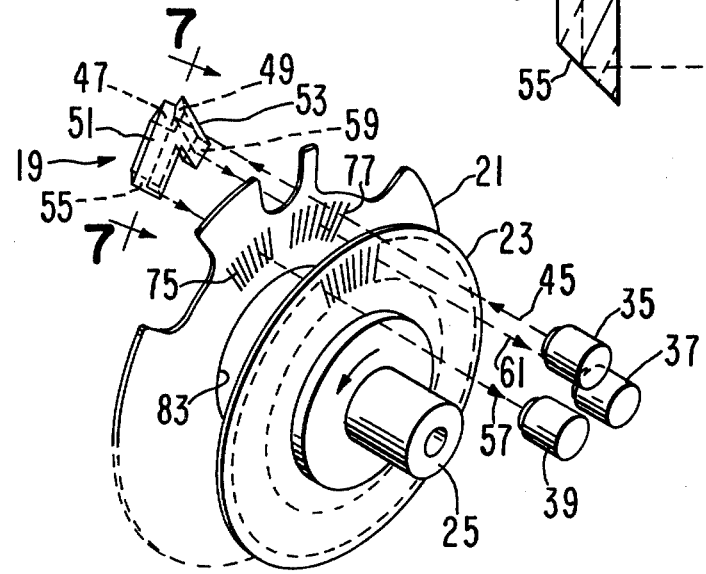
FIG. 6 is an exploded view of certain components of the encoder of FIGS. 1-5.

The optical path and structure of the optical element 19 can best be seen from the exploded view of FIG. 6. A beam of light 45 from the source 35 passes to the other side of the discs 21 and 23 and is incident upon a flat front surface of the optical element 19 that is substantially perpendicular thereto. As a result, substantially all of the light of the beam 45 enters the element 19. Although the element 19 is transparent, the beam 45 does not pass through the element 19 and out its back side because of two rear planar surfaces 47 and 49. These back surfaces 47 and 49 are positioned at greater than a critical angle with respect to the beam 45. As a result, the surfaces 47 and 49 reflect substantially all of the intensity of the beam 45 to other parts within the element 19 without any reflective coating necessary. The two surfaces 47 and 49 are immediately adjacent each other, joining in a line. They form an interface of the solid material of the element 19 with air. As best illustrated by FIG. 3 wherein the back side of the optical element 19 is shown, the incident light beam 45 is aligned with respect to the element 19 so that it strikes the reflective surfaces 47 and 49 with substantially equal flux. The beam straddles the line formed by intersection of the plane surfaces 47 and 49. Thus, about half of the flux of the incident beam 45 is directed down one leg 51 of the element 19, and the other approximately one-half of the flux directed down a second leg 53 of the element 19.

The ends of the legs 51 and 53 of the element 19 terminate in planar surfaces that are oriented at an angle with respect to the portion of the light beam 45 shining on it so that a substantial total reflection out of the element 19 occurs without the need for any reflective coating thereon. A surface 55 directs a light beam 57 through the discs 21 and 23 onto the detector 39. A surface 59 reflects light out of the element 19 in the form of a beam 61. There is no reflection as the beams 57 and 61 emerge from the front side of the element 19 since their angle therewith is made to be less than the critical angle for the material utilized of the solid element 19. Since reflection is accomplished by the critical angle phenomenon at interfaces between surfaces of the element 19 and air, the refractive index of the material from which the element 19 is made must be significantly different than that of air.

Figure 4:
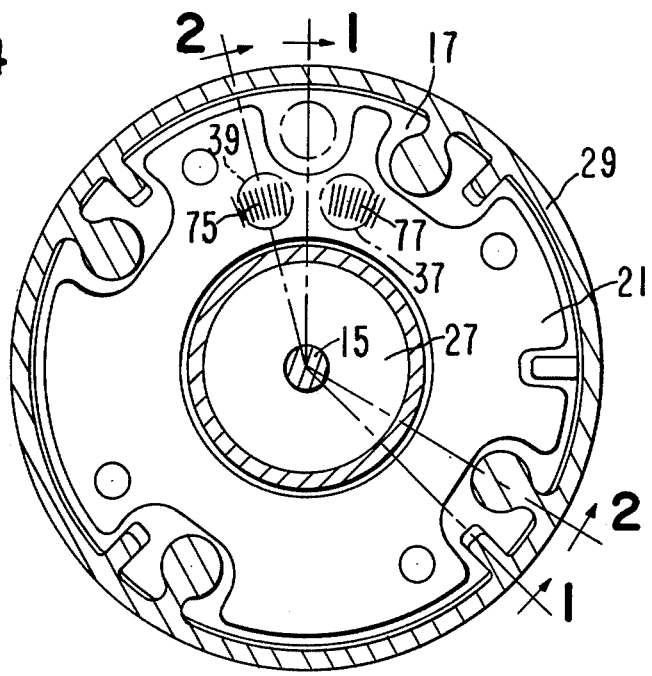
FIG. 4 is a view of the encoder of FIGS. 1-3 taken at section 4—4 of FIG. 1.
Figure 5:
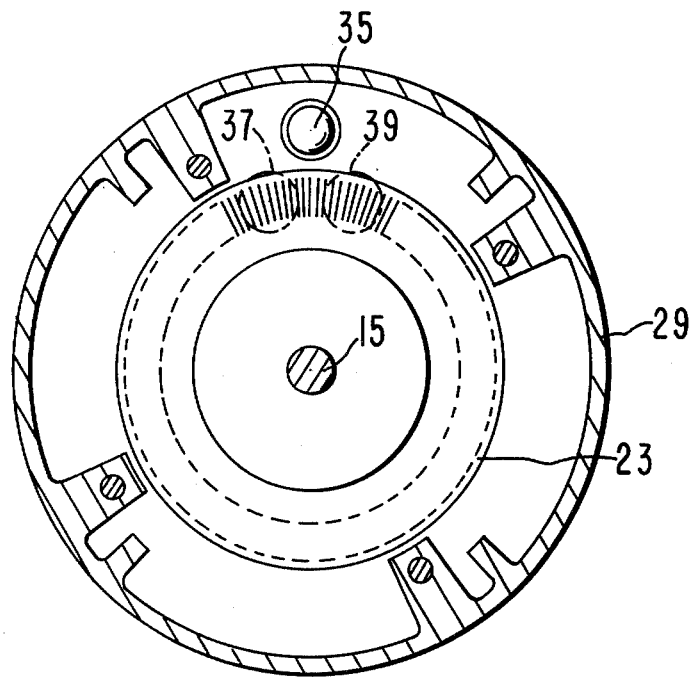
FIG. 5 is a sectional view of the encoder of FIGS. 1-4 taken at section 5—5 of FIG. 2.
Figure 7:
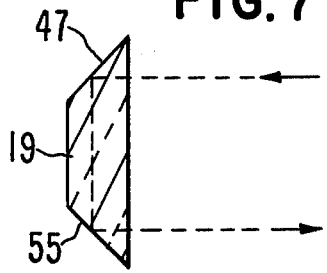
FIG. 7 is a sectional view through one element of the encoder assembly of FIGS. 1-6 taken at section 7—7 of FIGS. 3 and 6.

Referring to FIG. 4, two sets of slits 75 and 77 in the stator 21 lie in the path of the light directed to the detectors 39 and 37, respectively. These slits are provided on radial lines from the center of the stator 21. The stator 21 is also adjusted to have its center coincident with that of the rotating shaft 15.

The armature disc 23, carried by the shaft 15, similarly has slits provided on radial lines from the center rotation of the shaft 15. The slits of the armature 23 extend completely around it in a circular path. The size and spacing of the slits of the armature 23 are the same as that of each of the groupings 75 and 77 of slits on the stator 21. In a particular example, the slits are on a one degree pitch; that is, there is an opaque area and a slit opening in a one degree arc. The groups of slits 75 and 77 on the stator 21 are shifted with respect to one another by one-quarter of the pitch, or one quarter degree in the particular example given. This results in a triangularly shaped voltage waveform emitted from each of the detectors 35 and 39. The two detector outputs are shifted ninety degrees in phase from each other because of the one-quarter shift in pitch between the stator slit groups 75 and 77.

Because of the detectors 37 and 39 are detecting broad areas of light, their alignment with respect to the slits and openings is not critical. Alignment can be adequately obtained by moving the detectors through bending their supporting leads that are connected to the printed circuit board 31. Alignment of the light source 35 is similarly accomplished and this is more critical since it is desired that the light fall on the reflective interfaces 47 and 49 of the optical element 19 with substantially the same flux. This flux balance is adjusted with some precision.

Each of the groups of slits on the stator 21 and armature 23 have the same inside and outside diameters so that they will overlap each other. In order to obtain a sharp triangular waveform signal output from each of the detectors 37 and 39, it is necessary to provide very close alignment between the centers of each of the slit patterns on the stator 21 and armature 23. For the armature 23, its middle opening is made for a tight fit on the rotating shaft 15 and the art work of its slit pattern is made to have a center in the center of that opening. For the stator 21, the art work of its slits is made to have a center coincident with a center of its larger opening 83. In order to install the stator 21 on its base 17 in a manner that this common center is also on the center of the rotating shaft 15, a special alignment tool 85 is preferably utilized.

Figure 8:
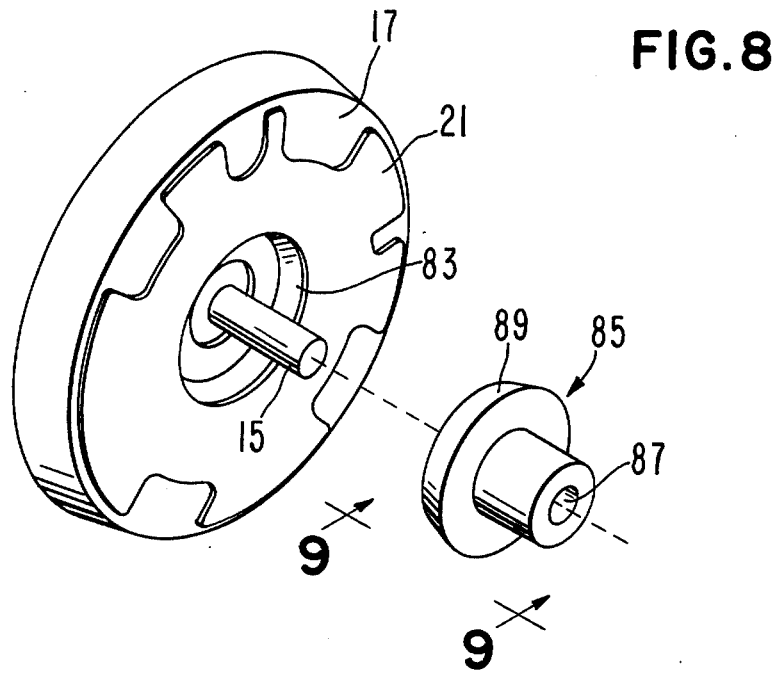
FIG. 8 illustrates a preferred technique of assembling and aligning one part of the encoder of FIGS. 1-7.
Figure 9:
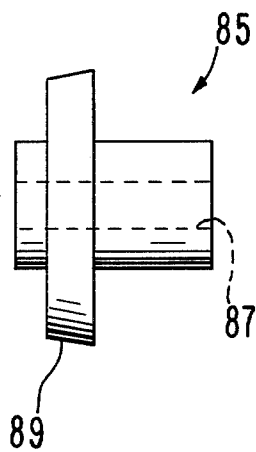
FIG. 9 is a side view of a tool illustrated in FIG. 8, as viewed from position 9—9 thereof.

As illustrated in FIGS. 8 and 9, the tool 85 includes a cylindrical opening 87 for fitting tightly onto the motor output shaft 15. An edge surface 89 of a larger portion of the tool 85 is circular in nature but with a varying diameter along its axis, as best seen by reference to FIG. 9. The smaller diameter of the smoothly shaped surface 89 is less than the diameter of the opening 83 of the stator 21. To align the stator 21, the tool 85 is slipped over the shaft 15 and into the hole 83 of the stator 21. The tool 85 is urged forward as the stator 21 is moved back and forth to permit the maximum possible advancement of the tool 85 along the shaft 15. The maximum diameter of the surface 89 of the tool 85 is larger than that of the opening 83 so that at some point the tool 85 has proceeded a maximum amount into the opening 83. This is the point where the stator 21 is centered. The screws or other fastening devices are then clamped to hold the stator 21 with respect to the base 17. If the stator 21 is made a part of the base 17, by embossing or some other technique, as mentioned previously, then the base member 17 would be aligned on the motor 11 in this way with the same tool 85.

The techniques of the present invention have application to a non-impact ink jet printer, wherein the motor within the case 11 drives the printing head back and forth across a platen in response to control signals. A margin sensing element gives an absolute printing head position signal. Its position is then given, with reference to that margin position, by the signals from the detectors 37 and 39 of the encoder described herein.

Although the various aspects of the present invention have been described with respect to a preferred embodiment thereof, it will be understood that the invention is entitled to protection within the full scope of the appended claims.

I claim:

1. An encoder for producing an electrical signal indicating rotary information of a shaft, comprising:
    a stationary encoder element,
    a rotary encoder element,
    a light source emitting a light beam,
    a light detector on one side of said encoder elements, and
    means on another side of said encoder and consisting of a solid optical element for receiving light from said light source, dividing it into two spatially separated beams and directing them to each of said encoder elements and thence to said detectors, said optical element being characterized by a plurality external surfaces to selectively transmit or reflect light thereat depending upon the angle such surfaces make with the light beam.

2. An encoder for producing an electrical signal indicating rotary information of a shaft, comprising:

a stationary disc carrying therearound a first circular light pattern characterized by a varying light transmission characteristic as a function of angular position, a rotary disc carrying therearound a second circular light pattern characterized by a varying light transmission characteristic as a function of angular position, the stationary and rotary discs being held closely in a non-contact relationship with their said first and second light transmission patterns superimposed, a light source held fixed on one side of said discs in a position directing a beam of light to another side of said discs without passing through said first and second light patterns, an optical system on said another side of the disc that includes a single optically clear solid element positioned with said light beam incident thereon, said element comprising:

a light beam entrance surface area on a front surface of said element that is non-reflective to said incident light beam, thereby providing a path into said element for said light beam, a pair of adjacent surfaces at the back of said element in the path of said incident beam and positioned at an angle with respect thereto in order to substantially totally reflect said beam in two separate angularly displaced paths through said solid element, and one surface on the back of said element in the path of each of said directed beams for substantially totally reflecting said beams through spatially separated portions of said discs at their superimposed light transmission pattern regions, and a pair of detectors positioned on said one side of said discs, one detector in each of said two beams passing through the disc.

3. The encoder according to claim 2 which additionally comprises a printed circuit board held fixed on said one side of said discs and generally parallel thereto, said board carrying circuits for conditioning signal outputs of said pair of detectors, said pair of detectors and said light source being mechanically supported by said board through there respective wire leads that are electrically connected to the circuits of said board.

4. The encoder according to claim 2 wherein said second circular light pattern comprises uniformly shaped slits alternating with uniformly shaped opaque portions and extending completely around said disc with a given fixed repetition period, and further wherein said first circular light pattern comprises two groups of alternating occurring slits and opaque segments with the same shape and periodicity as those of said second pattern, one of said groups being positioned in the path of a separate one of the beams that are directed through the discs to their respective detectors, said groups being shifted from each other one-quarter of their said fixed repetition period.

5. An encoder for producing an electrical signal indicating rotary information of a shaft, comprising:

a stationary disc carrying therearound a first circular light pattern characterized by a varying transmission characteristic as a function of angular position, a rotary disc carrying therearound a second circular light pattern characterized by a varying light transmission characteristic as a function of angular position, the stationary and rotary discs being held closely in a non-contact relationship with their said first and second light transmission patterns superimposed, first and second detectors held fixed on one side of said discs, a light source held to direct a beam to another side of said discs, an optical system on said another side of the disc that includes a single optically clear solid element positioned with said light source beam incident thereon, said element comprising:

front and back surfaces, said front surface facing said discs, two angularly displaced legs as viewed from said front surface, said legs joining together with two adjoining planar surfaces on the back surface thereof, the angle of said surfaces with respect to said front surface and the position of the element with respect to said light source beam being such that said beam enters the element through said front surface with little reflection and is incident upon said adjoining planar surfaces to be reflected as separate beams down each of the element legs, and two planar surfaces on the rear of each leg at its end removed from said adjoining surfaces, said two planar surfaces being angularly disposed with respect to said front surface to totally reflect each of the beams in the legs out of the element and separately through said superimposed light transmission patterns to said first and second detectors.

* * * * *